(12) United States Patent
Nagata et al.

(10) Patent No.: US 8,940,109 B2
(45) Date of Patent: Jan. 27, 2015

(54) METHOD FOR MANUFACTURING BASE MATERIAL FOR WAVE GEAR

(75) Inventors: Eiri Nagata, Toyoake (JP); Nobuaki Kurita, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 140 days.

(21) Appl. No.: 13/634,695

(22) PCT Filed: Mar. 14, 2011

(86) PCT No.: PCT/JP2011/055894
§ 371 (c)(1),
(2), (4) Date: Sep. 13, 2012

(87) PCT Pub. No.: WO2011/122315
PCT Pub. Date: Oct. 6, 2011

(65) Prior Publication Data
US 2013/0000788 A1  Jan. 3, 2013

(30) Foreign Application Priority Data

Mar. 30, 2010 (JP) ................................. 2010-078463

(51) Int. Cl.
| | | |
|---|---|---|
| *C21D 9/32* | (2006.01) | |
| *C23C 8/22* | (2006.01) | |
| *C23C 8/32* | (2006.01) | |
| *C21D 1/32* | (2006.01) | |
| *C21D 1/20* | (2006.01) | |
| *C22C 38/00* | (2006.01) | |
| *C22C 38/22* | (2006.01) | |
| *F16H 49/00* | (2006.01) | |

(52) U.S. Cl.
CPC .. *C21D 1/32* (2013.01); *C21D 1/20* (2013.01); *C22C 38/00* (2013.01); *C22C 38/22* (2013.01); *C21D 2211/002* (2013.01); *F16H 2049/003* (2013.01)
USPC ............................. 148/219; 148/586; 148/226

(58) Field of Classification Search
CPC ..................... C21D 2211/002; C21D 2211/00; C21D 9/32; C23C 8/32; C23C 8/02; C23C 8/22
USPC .......................................... 148/219, 586, 226
See application file for complete search history.

(56) References Cited

FOREIGN PATENT DOCUMENTS

| | | |
|---|---|---|
| CN | 1944715 A | 4/2007 |
| JP | 60155324 | 8/1985 |
| JP | 200055147 | 2/2000 |
| JP | 200683905 | 3/2006 |
| JP | 2008266694 | 11/2008 |

OTHER PUBLICATIONS

Combined Office Action and Search Report issued Apr. 19, 2013 in Chinese Application No. 201180014539.7 (With English Translation).
International Search Report Issued Jun. 14, 2011 in PCT/JP11/55894 Filed Mar. 14, 2011.
International Preliminary Report on Patentability issued Nov. 22, 2012 in PCT/JP2011/055894 filed Mar. 14, 2011.
Written Opinion issued Jun. 14, 2011 in PCT/JP2011/055894 filed Mar. 14, 2011.

*Primary Examiner* — Jessee Roe
(74) *Attorney, Agent, or Firm* — Oblon, Spivak, McClelland, Maier & Neustadt, L.L.P.

(57) ABSTRACT

A method for manufacturing a base material for a wave gear which enables the effective suppression of man-hours and manufacturing cost while providing the required strength and elastic deformation characteristics for an external gear of a wave gear. In this manufacturing method, steel having a carbon content of 0.48% or less is subjected to primary molding by being cold worked into the shape of an external gear for a wave gear. The resulting primary molded article is heated to a temperature range in which the main phase of the metallographic structure thereof forms an austenitic structure. The main phase of the metallographic structure is formed into bainite by carrying out quenching to a predetermined temperature higher than the martensitic transformation starting temperature and maintaining the temperature for a predetermined time. The product is then cooled to normal temperature.

12 Claims, 3 Drawing Sheets

METHOD FOR MANUFACTURING BASE MATERIAL FOR WAVE GEAR

TECHNICAL FIELD

The present invention relates to a method for manufacturing an external gear, the cross-sectional shape of which in particular is forced to elastically deform, in a wave gear device having an annular rigid internal gear, an annular flexible external gear disposed inside the internal gear, and a wave generator fitted inside the external gear to cause a portion of outer teeth formed in the flexible external gear flexed in the radical direction to mesh with inner teeth formed in the rigid internal gear, and to generate, between the internal gear and the external gear, a relative rotation that is in accordance with the difference in the number of inner teeth and outer teeth by moving the mesh point in the circumferential direction.

BACKGROUND ART

A known method for manufacturing this type of external gear involves the following series of procedures: hot forging→full turning→gear cutting→shot peening→selecting external gears that match the internal gear and assembling the gears.

SUMMARY OF THE INVENTION

Problem to be Solved by Invention

When a wave gear provided with an external gear and an internal gear transmits a rotational drive force, the external gear is forced to undergo significant continuous elastic deformation as the external gear rotates while meshed with the internal gear. However, in the conventional manufacturing method described above, excessive heat treatment in the hot forging step causes changes in the internal structure of the metal, unnecessary stress is applied, and internal stress is prone to remain. As a result, the required strength or elastic deformation characteristics may not be obtained. In order to overcome this problem, a manufacturing method (referred to hereinafter as the bulk cutting process) has been applied in which a solid material having the necessary mechanical characteristics is first fabricated, a base material for the external gear is cut out from the solid material over a long period of time, and this base material is then machined to provide precise teeth. However, the machining produces a large amount of shavings, resource and energy consumption are significant, as well as cutting blade consumption, and extremely long processing times can be required.

Therefore, in view of the drawbacks of the conventional manufacturing method described above, an object of the present invention is to provide a manufacturing method which enables the effective suppression of man-hours and manufacturing cost while providing the required strength and elastic deformation characteristics particularly for an external gear of a wave gear device.

Means for Solving the Problems

In the method for manufacturing a base material for a wave gear according to a first aspect of the present invention, steel having a carbon content of 0.5% or less is subjected to primary molding by being cold worked into the shape of an external gear for a wave gear, the resulting primary molded article is heated to a temperature range in which the main phase of the metallographic structure thereof forms an austenitic structure, rapid cooling is carried out to a predetermined temperature higher than a martensitic transformation starting temperature, and the predetermined temperature is maintained for a predetermined time, thereby forming a metallographic structure having bainite as the main phase thereof, and the product is cooled to normal temperature.

In the method for manufacturing a base material for a wave gear according to the first aspect of the present invention, a raw material in a plate shape or other shape is first subjected to primary molding into a shape that approximates the shape of the desired external gear by drawing, wall thickening, or other cold working. Cutting therefore does not produce large amounts of shavings, and a base material for an external gear can be obtained in a short time. The steel used as the raw material herein has a carbon content of 0.5% or less. Defects such as breakage or cracking therefore do not readily occur when the steel is cold worked. The primary molded article is then heated to a temperature range in which the main phase of the metallographic structure thereof forms an austenitic structure. This process removes residual stress that occurs in the base material during cold working, and that can cause breakage during use. When the primary molded article has been quenched to a predetermined temperature higher than a martensitic transformation starting temperature after heating, the predetermined temperature is maintained for a predetermined time, and a metallographic structure having bainite as the main phase thereof is obtained. A satisfactory primary molded article (base material for a wave gear) can thereby be stably obtained, in which the base material for a wave gear has both the desired machining properties for gear cutting and the necessary spring characteristics and toughness.

In the method for manufacturing a base material for a wave gear according to a second aspect of the present invention, steel having a carbon content of 0.5% or less is subjected to primary molding by being cold worked into the shape of an external gear for a wave gear, the resulting primary molded article is heated to a temperature range in which the main phase of the metallographic structure thereof forms an austenitic structure, rapid cooling to a martensite region and subsequent tempering, thereby forming a metallographic structure having sorbite as the main phase thereof, and the product is cooled to normal temperature.

In the method for manufacturing a base material for a wave gear according to the second aspect of the present invention, a raw material in a plate shape or other shape is first subjected to primary molding into a shape that approximates the shape of the desired external gear by drawing, wall thickening, or other cold working. Cutting therefore does not produce large amounts of shavings, and a base material for an external gear can be obtained in a short time. Since the steel used as the raw material herein has a carbon content of 0.5% or less, structural degradation does not readily occur when the steel is cold worked. The primary molded article is then heated to a temperature range in which the main phase of the metallographic structure thereof forms an austenitic structure. This process removes residual stress that occurs in the base material during cold working, and that can cause breakage during use. After this heating, rapid cooling is carried out to a martensite region, followed by tempering, thereby forming a metallographic structure having sorbite as the main phase thereof. As a result, a satisfactory primary molded article (base material for a wave gear) can be stably obtained, in which the base material for a wave gear has both the desired machining properties for gear cutting and the necessary spring characteristics and toughness.

In another aspect of the manufacturing method of the present invention, chromium-molybdenum steel having a carbon content of 0.4% or less is used as the steel.

In this aspect, a base material for a wave gear is obtained in which the difference in hardness between the surface of the raw material for heat treating and the inside thereof is particularly small. Adequate hardness is therefore obtained with respect to the root portion formed by cutting in a subsequent step, thus making the process more convenient.

In another aspect of the manufacturing method of the present invention, the hardness of the metallographic structure ultimately obtained is set to Hv 300-500 by maintaining the primary molded article in a carburizing or carbo-nitriding gas atmosphere for a predetermined time in the temperature region at which the austenitic structure is formed.

In this aspect, such carburizing or carbo-nitriding can increase the carbon concentration of the surface and inside of the base material for a wave gear to 0.3-1.0%. As a result, the hardness of the surface and inside of the base material for a wave gear increases to Hv 300-500, satisfactory spring characteristics are obtained, and abrasion resistance is also enhanced. By adjusting the atmosphere or time of carburizing or carbo-nitriding, the hardness of an arbitrary steel material having a carbon concentration of 0.5% or less can be controlled to the desired value.

In another aspect of the manufacturing method of the present invention, the difference between the maximum hardness and minimum hardness of the metallographic structure ranging to a depth of 2 mm from a surface of the base material is set to within Hv 130 by maintaining the primary molded article in a carburizing or carbo-nitriding gas atmosphere for a predetermined time in the temperature region at which the austenitic structure is formed.

In this aspect, a base material for a wave gear is obtained in which the difference in hardness between the surface of the raw material for heat treating and the inside thereof is even smaller. Even greater hardness is therefore obtained with respect to the root portion formed by cutting in a subsequent step.

When there is a difference in hardness between the surface and the inside of the raw material for heat treating, in the case that heat treatment causes distortion in the originally circular raw material, after the material is cut into a circular shape in a subsequent step, there is a risk that the hardness of the teeth ultimately formed will vary in the circumferential direction. In the present aspect, however, the strength of the teeth in the final external gear is made adequately uniform.

In another aspect of the manufacturing method of the present invention, quenching from the temperature region in which the austenitic structure is formed is performed by gas quenching using an inert gas.

Since gas quenching using nitrogen, helium, or other inert gas generally exhibits lower quenching performance than oil quenching, the expected cooling rate is difficult to obtain, and ferrite or perlite is prone to be precipitated. However, when a base material for a wave gear having a small wall thickness and a large specific surface area is the article to be heat treated, ferrite or perlite is not readily precipitated by gas quenching in the manner of the present aspect, and a primary molded article having high hardness and uniform structure is obtained. Gas quenching using nitrogen, helium, or another inert gas also makes it possible to prevent oxidation of the steel. The environmental impact is also greatly reduced relative to quenching methods that use a salt bath or an oil tank, and the need for post-process washing can be obviated.

In another aspect of the manufacturing method of the present invention, after the primary molded article has been maintained in a carburizing or carbo-nitriding gas atmosphere for a predetermined time, the primary molded article is exposed for a predetermined period of time to a decarbonizing atmosphere having a low carbon potential.

In this aspect, since the surface of the raw material is decarbonized and the hardness is reduced in a surface layer portion having a specific thickness, the service life of the blade in the cutting step can be extended.

MODES OF EMBODYING THE INVENTION

Embodiments of the present invention will be described below with reference to the accompanying drawings.

The manufacturing method of the present invention relates to a base material for a wave gear capable of transmitting a rotational torque at an extremely high reduction ratio, and particularly relates to a base material for an external gear (flex spline) for meshing with an internal gear (circular spline) by elastic deformation from a circular shape to an elliptical shape in a wave gear.

(Steel Material)

The raw material used as the starting material in the present invention is a steel material having a carbon content of approximately 0.5% or less. For example, a cold-rolled steel plate, hot-rolled steel plate, high-tensile steel plate, carbon steel plate, low-alloy steel plate, stainless steel plate, or the like may be used. In particular, carbon steel plates such as S40C, S45C, and S48C, and low-alloy steel plates such as SCM420 and SNCM220 may be used.

For reference, the component specifications (JIS) of SCM420 and S45C steel as typical examples of raw materials that can be used in the present invention are shown in Table 1 below.

TABLE 1

| JIS | C | Si | Mn | P | S | Cu | Ni | Cr | Ni + Cr | Mo |
|---|---|---|---|---|---|---|---|---|---|---|
| SCM420 | 0.18-0.23 | 0.15-0.35 | 0.60-0.85 | 0.030 or less | 0.030 or less | 0.30 or less | 0.25 or less | 0.90-1.20 | — | 0.15-0.30 |
| S45C | 0.42-0.48 | 0.15-0.35 | 0.60-0.90 | 0.030 or less | 0.035 or less | 0.30 or less | 0.20 or less | 0.20 or less | 0.35 or less | — |

(Molding)

Figure 1:
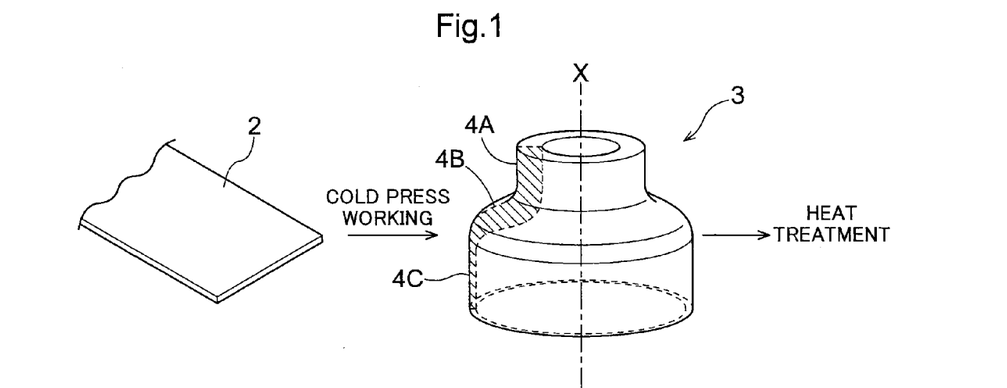
FIG. 1 is a rough view of a method for manufacturing a base material for a wave gear according to the present invention.

As shown in FIG. 1, a plate 2 conforming to the conditions described above is subjected to primary molding at room temperature into a shape that approximates the shape of the desired external gear by press forming, drawing, wall thickening, cold forging, rotary drawing, rotary swaging, or another process. Prior to this cold working, the plate is preferably subjected to spheroidizing annealing to facilitate cold working.

The primary molded work piece 3 is in a shape similar to that of the completed external gear of the wave gear, and has a small-diameter output portion 4A, a flange portion 4B extending outward in the radial direction from the other end of the output portion 4A, and a large-diameter cylindrical tube portion 4C extending along an axis X from the flange portion 4B.

After heat treatment, outer teeth (not shown) for meshing with an internal gear are cut on the external periphery of the cylindrical tube portion 4C by a gear hobbing machine or the like.

(Heat Treatment)

Depending on the type of steel used, any of Carbo-Austempering, carburized quenching and tempering, austempering without carburizing, and quenching and tempering without carburizing can be applied as the method for heat treating the primary molded work piece 3. The purpose of heat treatment is to give the work piece 3 the spring properties that are required of an external gear of a wave gear, and to minimize distortion that leads to reduced durability. Heat treatment is preferably done using heat treatment equipment that enables strict temperature control, and particularly that enables rapid cooling.

(Carbo-Austempering)

Figure 2:
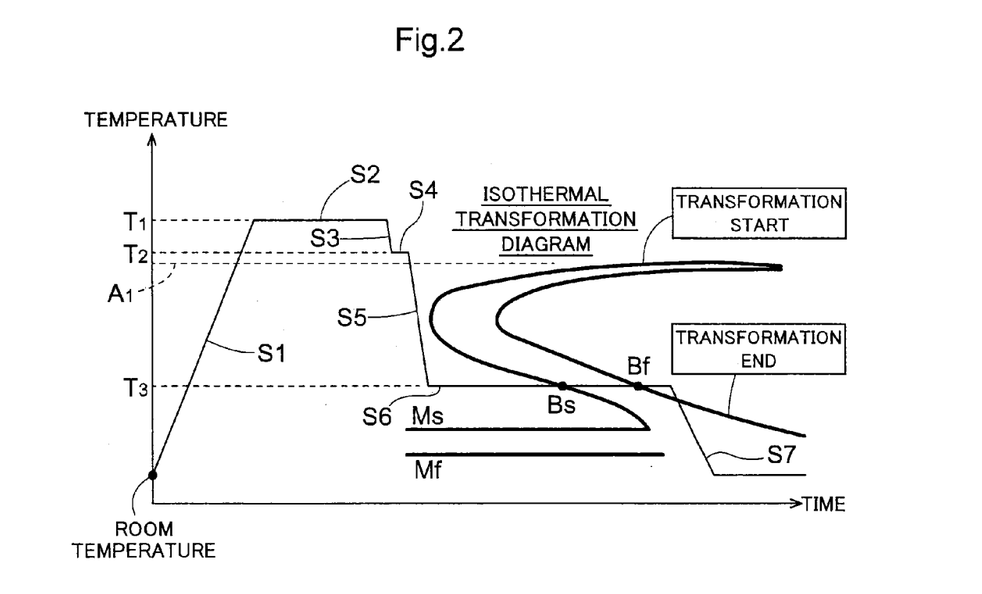
FIG. 2 is a conceptual view of a temperature sequence used in a heat treatment step of the present invention.

FIG. 2 is a view showing the temperature sequence of Carbo-Austempering together with the isothermal transformation diagram for eutectoid carbon steel.

As shown by the temperature sequence in FIG. 2, the work piece 3 is first heated, by electrical heating or the like, to a predetermined temperature $T_1$ (e.g., 930° C.) that is higher than the $A_3$ transformation temperature or the $A_1$ transformation temperature and that is in the region in which the main phase of the metallographic structure is nearly all austenite (S1), and the same temperature $T_1$ is then maintained for a predetermined time (S2). Maintaining the temperature at $T_1$ in step S2 forms a stable austenite structure. Internal distortion that occurs during cold working is also effectively eliminated at the same time.

The heated work piece 3 is then cooled to a temperature $T_2$ (e.g., 870° C.) higher than the $A_1$ transformation temperature and lower than the temperature $T_1$ (S3), and the same temperature $T_2$ is maintained for a predetermined time (S4). This maintenance of temperature suppresses distortion that accompanies heat treatment. Final distortion is kept low in an external gear that is produced with distortion-suppressing effects. The amount of work involved in the subsequent machining can also be reduced.

Figure 3:
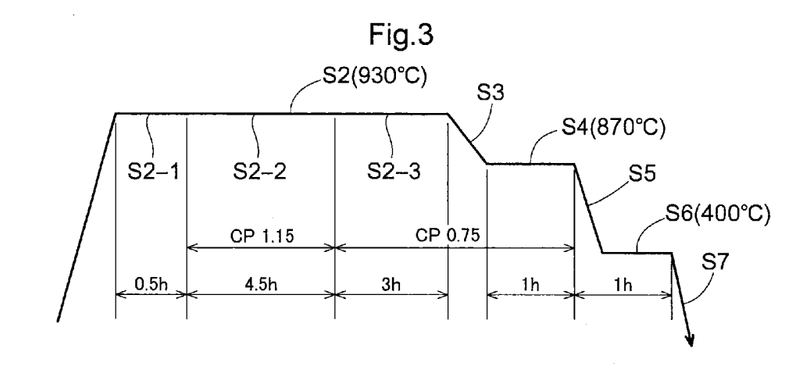
FIG. 3 is a conceptual view supplementing the temperature sequence of FIG. 2.

As shown in FIG. 3, in Carbo-Austempering in the present embodiment, the step (S2) of maintaining the material at a temperature in the austenite region for a predetermined time, the step (S3) of cooling the material to the temperature $T_2$, and the step (S4) of maintaining the material at the same temperature $T_2$ for a predetermined time are performed in a carburizing gas atmosphere (carburizing treatment). By increasing the carbon concentration in the metallographic structure to 0.3-1.0%, preferably 0.4-0.8%, by this treatment, the hardness of the metallographic structure is controlled to a value of Hv 300-500. The length of the carburizing treatment is determined in accordance with the thickness or design (high spring property-imparting region, or the like) of the work piece 3, but the treatment time can be reduced by using vacuum carburizing as the carburizing treatment. A carbo-nitriding treatment (vacuum carbo-nitriding) may also be used instead of a carburizing treatment (vacuum carburizing).

Describing the carburizing method more specifically, in the step (S2) of maintaining the temperature at $T_1$, the temperature in the raw material is first made uniform for approximately 0.5 hour (S2-1), then carburizing is performed at a high carbon concentration (CP value: approximately 1.15) for approximately 4.5 hours, and lastly, carburizing is performed at a slightly lower carbon concentration (CP value: approximately 0.75) for approximately 3 hours, as shown in FIG. 3. The step (S3) of cooling to the temperature $T_2$ and the step (S4) of maintaining the temperature $T_2$ are then performed while the carbon concentration (CP value: approximately 0.75) is maintained.

The material is then rapidly cooled by gas quenching, salt (salt bath) quenching, or the like to a predetermined temperature $T_3$ (e.g., 400° C.) higher than the martensitic transformation starting temperature (S5). In order to prevent precipitation of perlite and ferrite, this rapid cooling is performed in a short time (1-10 seconds) so that the nose (generally near 550° C.) of the transformation start line in the isothermal transformation diagram shown in FIG. 2 is not reached. In order to make such rapid cooling possible, the wall thickness of the primary-worked work piece 3 is preferably small, as shown in FIG. 1.

The material is then maintained at the same temperature $T_3$ for an adequately long period of time (S6). Lower bainite precipitates in the period from near the intersection (Bs) with the transformation start line to near the intersection (Bf) with the transformation end line during temperature maintenance. Lower bainite has a needle-shaped structure, and has high toughness and adequate but not excessive hardness like martensite.

After S6 is completed, the material is rapidly cooled to room temperature (S7). Since the base material for a wave gear ultimately obtained has a metallographic structure having lower bainite as the main phase thereof, the base material for a wave gear possesses suitable working properties while being provided with both satisfactory spring characteristics and adequate toughness, and hardness is ensured therein. After the external shape of the resultant base material for a wave gear is adjusted with further precision by subsequent machining, an external gear provided with dimensional precision, durability, and spring properties is obtained by cutting outer teeth through use of a gear hobbing machine or the like.

Depending on the convenience of equipment, the sequence of steps from S1 to S4 and the sequence of steps from S6 to S7 may sometimes have to be performed by separate pieces of equipment that are at a distance from each other. In such cases, after step S4 is completed on the first equipment, as step S5, the raw material may be transported to the second equipment in such a manner that the temperature of the material does not fall below $T_3$ (400° C. or another temperature) while the material is exposed to the air, and steps S6 and S7 may be performed after the material reaches the second equipment. This method is referred to hereinafter as the step division method.

(Carburized Quenching and Tempering)

In carburized quenching and tempering, the primary molded article is heated to a temperature range at which the main phase of the metallographic structure forms an austenitic structure. After rapid cooling to the martensite region, tempering is performed, and the main phase of the metallographic structure forms a sorbite structure in the base material for a wave gear ultimately obtained. As a result, adequate hardness and the necessary spring properties for an external gear of a wave gear are obtained.

Figure 4:
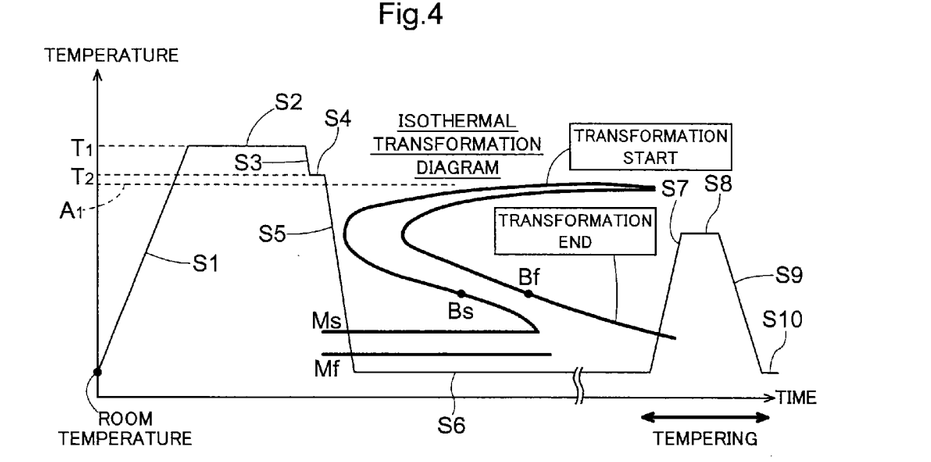
FIG. 4 is a conceptual view of a temperature sequence used in a heat treatment step of another embodiment.

FIG. 4 is a view of the temperature sequence in carburized quenching and tempering. As shown by the temperature sequence of FIG. 4, the steps S1 through S4 in heat treatment of the work piece 3 are the same as the heat treatment steps shown in FIGS. 2 and 3.

The temperature sequence for carburized quenching and tempering in FIG. 4 differs from that of the Carbo-Austempering of FIG. 2 in that the material is rapidly cooled from the predetermined temperature ($T_2$) to a temperature in the martensite region by gas quenching or the like (S5) and maintained at the same temperature (S6), and tempered to a temperature (approximately 550° C.) at which sorbite readily precipitates (S7, S8), thereby causing the main phase of the metallographic structure to form a sorbite structure, and then the material is rapidly cooled to normal temperature (S9). A sorbite structure has large amounts of cementite (fine particles) precipitated in a ferrite texture, and has high toughness and adequate but not excessive hardness like martensite. Steel gears are usually tempered at a temperature near 150° C., but tempering in this case is performed at a high temperature of approximately 550° C. in order to impart the desired characteristics for a wave gear base material.

Figure 5:
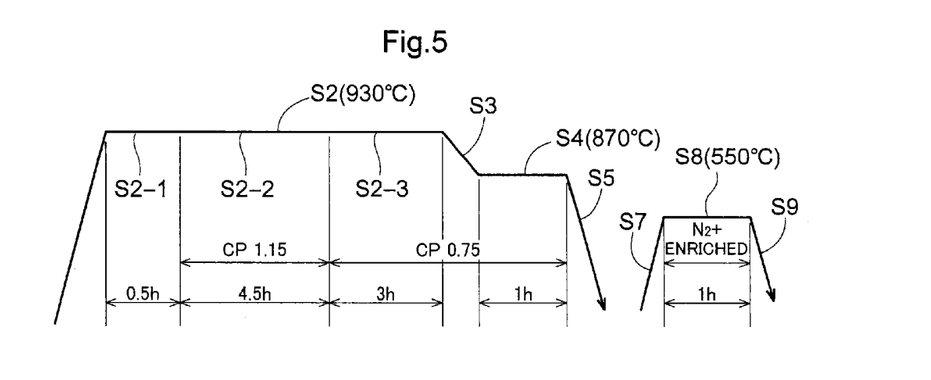
FIG. 5 is a conceptual view supplementing the temperature sequence of FIG. 4.

As shown in FIG. 5, in carburized quenching and tempering in the present embodiment, the step (S2) of maintaining the material at a temperature in the austenite region for a predetermined time, the step (S3) of cooling the material to the temperature $T_2$, and the step (S4) of maintaining the material at the same temperature $T_2$ for a predetermined time are performed in a carburizing gas atmosphere (carburizing treatment), the same as in FIG. 3 for Carbo-Austempering. A carbo-nitriding treatment (vacuum carbo-nitriding) may be used instead of a carburizing treatment (vacuum carburizing) in this case as well.

As shown in FIG. 5, carburizing is not performed in the tempering step (S8), but the step is performed in a carbon-enriched $N_2$ gas atmosphere. The $N_2$ gas is used to prevent the surface of the raw material from oxidizing, and carbon enrichment with butane gas or the like is performed to prevent carbon introduced in the carburizing of the previous step from escaping outside the metallographic structure. The final rapid cooling (S9) to room temperature after the tempering step (S8) is performed using oil quenching in oil at approximately 120° C.

TABLE 2

Evaluation of Cost, Molding Properties, and Heat Treatment

| Steel Type | Material Cost | Press Molding Properties | Process | Heat Treatment | | | | | |
|---|---|---|---|---|---|---|---|---|---|
| | | | | Hardness | Structure-Bainite/Sorbite | Structure-Fine Uniformity | Distortion | Assessment | |
| SCM420 | ○ | ○ | Carbo-Austempering | ○ | ○ | ○ | ◎ | ◎ | ←A1 |
| | | | Austempering | X | ○ | ○ | ◎ | X | |
| | | | Carburized quenching and tempering | ○ | ○ | ○ | ○ | ◎ | ←A2 |
| | | | Quenching and tempering | ○ | ○ | Δ | ○ | ○ | |
| S45C | ○ | ○ | Carbo-Austempering | Δ | $X_F$ | X | ◎ | X | |
| | | | Austempering | X | $X_F$ | X | ◎ | X | |
| | | | Carburized quenching and tempering | Δ | ○ | Δ | ○ | Δ | |
| | | | Quenching and tempering | Δ | ○ | ○ | ○ | ○ | ←A3 |
| SNCM220 | X | Δ | Carbo-Austempering | ○ | ○ | ○ | ○ | Δ | |
| | | | Austempering | Δ | ○ | ○ | ○ | | |
| | | | Carburized quenching and tempering | Δ | ○ | ○ | Δ | | |
| | | | Quenching and tempering | ○ | ○ | ○ | Δ | | |
| SNCM439 | X | X | Carbo-Austempering | — | | | | Δ | |
| | | | Austempering | ○ | ○ | Δ | ○ | | ←R1 |
| | | | Carburized quenching and tempering | — | | | | | |
| | | | Quenching and tempering | Δ | ○ | ○ | Δ | | ←R2 |

TABLE 2-continued

Evaluation of Cost, Molding Properties, and Heat Treatment

| Steel Type | Material Cost | Press Molding Properties | Process | Heat Treatment | | | | |
|---|---|---|---|---|---|---|---|---|
| | | | | Hardness | Structure-Bainite/Sorbite | Structure-Fine Uniformity | Distortion | Assessment |
| SPH440 | ◎ | ○ | Carbo-Austempering | X | X$_F$ | X | ◎ | X |
| | | | Austempering | | | | ◎ | |
| | | | Carburized quenching and tempering | | | | ○ | |
| | | | Quenching and tempering | | | | ○ | |

($_F$Ferrite precipitation)

(Comparison of Characteristics According to Steel Type and Heat Treatment Conditions)

Table 2 above shows the material cost, the press molding properties, and the characteristics obtained by the various heat treatments for a plurality of steel types selected as candidates for the raw material used to manufacture the base material for a wave gear. The steel types examined include SCM420 (chromium molybdenum steel; carbon content: approximately 0.2%), S45C (carbon steel; carbon content: approximately 0.45%), SNCM220 (nickel chromium molybdenum steel; carbon content: approximately 0.2%), SNCM439 (nickel chromium molybdenum steel; carbon content: approximately 0.39%), and SPH440 (high-tensile rolled steel; carbon content: approximately 0.15%).

Four types of heat treatment methods were compared, specifically, Carbo-Austempering based on the heat treatment process of FIGS. 2 and 3, austempering (without carburizing) based on the heat treatment process of FIG. 2, carburized quenching and tempering based on the heat treatment process of FIGS. 4 and 5, and quenching and tempering (without carburizing) based on the heat treatment process of FIG. 4.

In Carbo-Austempering and austempering (without carburizing), the step division method was used for the convenience of equipment.

SNCM439 in particular was the material used as the solid material in the aforementioned bulk cutting process, and served as a reference material for verifying the performance of the base material for a wave gear according to the present invention. Since carburizing treatment is anticipated to cause severe excess hardness, lack of toughness, and reduction in cutting properties in SNCM439, a heat treatment not including carburizing was performed.

Press molding properties were evaluated according to deviation from circularity after deep drawing into a cup shape for all samples, and materials with a deviation from circularity of less than 0.1 were deemed satisfactory. Distortion in heat treatment was designated as dimensional distortion caused by heat treatment. Hardness was evaluated using a Vickers hardness tester, and a range of Hv 330-400 was deemed satisfactory.

In Table 2, the material costs for SNCM220 and SNCM439 received an unsatisfactory (x) evaluation because the prices of these steels are several times that of SCM420 or S45C, and because the marketability of these steels as plates is currently low.

As is apparent from Table 2, SCM420 in Carbo-Austempered form (referred to hereinafter as A1) satisfies all reference values for material cost, press molding properties, hardness, structural state, and distortion. The SCM420 in carburized quenched and tempered form (referred to hereinafter as A2) also satisfies all reference values, although the distortion thereof is slightly higher than that of A1.

The S45C in quenched tempered (without carburizing) form (referred to hereinafter as A3) satisfies all reference values except for being slightly below the reference value for hardness, and is excellent in material cost relative to SCM420, and is therefore deemed satisfactory.

The characteristics of SNCM220 and SNCM439 after heat treatment were generally satisfactory, but because the deviation from circularity of SNCM220 in press molding significantly exceeded 0.1, thus not satisfying the reference value, and breakage occurred after press molding in SNCM439, the evaluation results were deemed good. The press molding properties of these materials can be improved through use of warm forming, a servo press, or the like. The austempered SNCM439 is referred to as reference material R1, and the quenched and tempered SNCM439 is referred to as reference material R2.

The press molding properties of SPH440 were satisfactory, and the material cost thereof was superior to that of S45C, but because the reference value for hardness thereof was not satisfied, and ferrite precipitation was observed in the structure thereof after heat treatment, the results of evaluation thereof were not good.

TABLE 3

Measurements of Physical Properties

| | | Hardness (HV) | | Fatigue Limit at 2,000,000 Cycles (N/mm$^2$) | Total distortion at elastic limit (%) | Tensile Tests | | | |
|---|---|---|---|---|---|---|---|---|---|
| Steel Type | Heat Treatment | Surface | Center | | | 0.2% Yield strength (N/mm$^2$) | Tensile strength (N/mm$^2$) | Elongation (%) | |
| SCM420 | Carbo-Austempering | 391 | 347 | 620 | 0.36 | 927 | 1135 | 14.2 | ←A1 |
| | Carburized quenching | 397 | 336 | 580 | 0.42 | 1022 | 1119 | 16.1 | ←A2 |

TABLE 3-continued

Measurements of Physical Properties

| | | Hardness (HV) | | Fatigue Limit at 2,000,000 Cycles | Tensile Tests | | | | |
|---|---|---|---|---|---|---|---|---|---|
| | | | | | Total distortion at elastic limit | 0.2% Yield strength | Tensile strength | Elongation | |
| Steel Type | Heat Treatment | Surface | Center | (N/mm²) | (%) | (N/mm²) | (N/mm²) | (%) | |
| S45C | and tempering Quenching and tempering | 271 | 271 | 450 | 0.36 | 737 | 878 | 21.4 | ←A3 |
| SNCM439 | Austempering | 348 | 346 | 480 | 0.32 | 918 | 1144 | 12.2 | ←R1 |
| | Quenching and tempering | 331 | 327 | 460 | 0.44 | 916 | 1023 | 15.2 | ←R2 |

(0.75 mm) (1.5 mm)

(Physical Properties Comparison 1)

Table 3 shows the three materials (A1, A2, A3) determined to be most suitable as base materials for a wave gear on the basis of the evaluation results shown in Table 2, and the results of measuring more detailed physical property values (hardness, fatigue limit, tensile tests) for two materials (R1, R2) as reference materials. Hardness was measured at two locations: the sample surface (0.75 mm from the sample surface) and near the center (1.5 mm from the sample surface).

The fatigue limit at 2,000,000 cycles (N/mm²) was measured using a sample having a thickness of 3.5 mm by plane bending fatigue testing in accordance with JIS Z2275. Tensile testing was carried out using a plate-shaped sample having a thickness of 2 mm and a width of approximately 6 mm.

As is apparent from Table 3, the Carbo-Austempered SCM420 (A1) and the carburized quenched and tempered SCM420 (A2) were both equal in terms of physical properties to the SNCM439 (R1, R2) as reference materials subjected to equivalent heat treatments (but without carburizing), with respect to hardness, fatigue limit, and tensile tests.

The quenched and tempered S45C (A3) had a lower measured value for hardness than the other materials (A1, A2, R1, R2), but because no significant differences were observed in the results for fatigue limit and tensile tests, it may be possible to enhance this material to a usable level by finely adjusting the heat treatment conditions or the like, or this material may be usable depending on the range of applications of the wave gear.

(Physical Properties Comparison 2)

Figure 6:
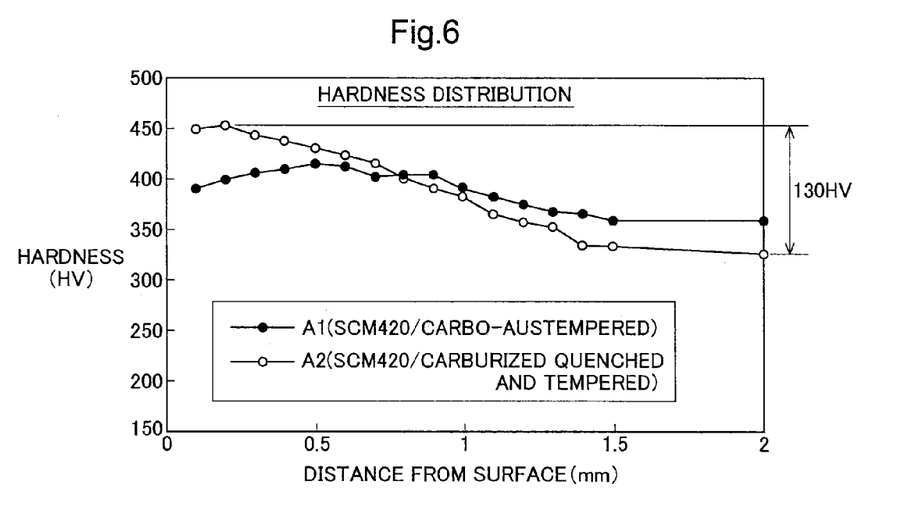
FIG. 6 is a graph of a hardness distribution of a raw material after heat treatment.

FIG. 6 shows the hardness distribution obtained by measuring the hardness at each depth from the surface of the sample for the two materials (A1, A2) determined to be most suitable as base materials for a wave gear on the basis of the evaluation results shown in Table 3. The material A1 was heat treated by the step division method based on FIG. 3.

As is apparent from FIG. 6, the two materials (A1, A2) both achieve satisfactory results that fall within the relatively narrow range of 300-500 HV irrespective of the depth from the surface of each sample. Comparison of the two materials (A1, A2) shows that the hardness at the locations closest to the surface (0.1-0.8 mm) is higher in the carburized quenched and tempered SCM420 (A2) than in the Carbo-Austempered SCM420 (A1). As for the hardness inside the samples (0.8-2.0 mm), the hardness is higher in the Carbo-Austempered material (A1) than in the carburized quenched and tempered material (A2).

In the Carbo-Austempered SCM420 (A1), the hardness reached the maximum value thereof (420 HV) at a depth of 0.5 mm from the surface, the hardness decreased toward the surface from this position, and the hardness tended to decrease on either side from the same position as the depth from the surface increased, the hardness being in the overall range of 420 HV (maximum value) to 365 HV (minimum value) (with a difference of 55 HV between the maximum and the minimum values).

In the carburized quenched and tempered SCM420 (A2), the hardness reached the maximum value thereof (455 HV) at a depth of 0.2 mm from the surface, the hardness decreasing generally on the right side of the graph relative to the maximum position as the depth from the surface increased, and the hardness was in the overall range of 455 HV (maximum value) to 330 HV (minimum value) (with a difference of approximately 130 HV between the maximum and minimum values).

At least with regard to SCM420, it is apparent that the size of distortion due to heat treatment is within 0.5 mm for both the Carbo-Austempered material (A1) and the carburized quenched and tempered material (A2), and when these materials are actually treated for use as a base material for a wave gear, a somewhat larger work piece 3 in which distortion (0.5 mm or less) caused by such heat treatment processes is expected is subjected to primary molding. Specifically, the slightly low-hardness portion (ranging to 0.5 mm from the surface) at the surface of the Carbo-Austempered material (A1) in the hardness distribution of FIG. 6 is removed by cutting after heat treatment, and therefore need not be considered to be a problem, and instead can be considered helpful for extending the service life of the blade used for cutting.

Figure 7:
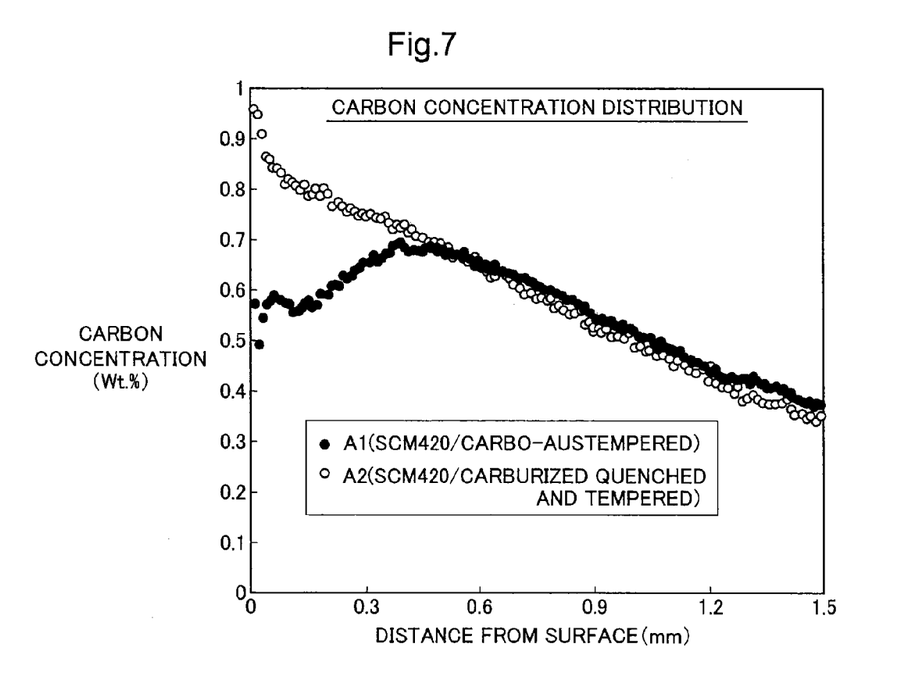
FIG. 7 is a graph of a distribution of carbon concentration in a raw material after heat treatment.

FIG. 7 shows the carbon concentration distribution obtained by measuring the carbon concentration by EPMA for the two materials (A1, A2) determined to be most suitable as base materials for a wave gear.

As is apparent from FIG. 7, the carbon concentrations within (0.5-1.5 mm) the samples of the two materials (A1, A2) compared show the general tendency to increase linearly as the distance to the surface decreases, for both heat treatment methods. The values of the carbon concentrations themselves are also substantially equal, and carburizing treatment is shown to be satisfactorily advanced.

Meanwhile, at the portion nearest the surface (0-0.5 mm), the carbon concentration in the carburized quenched and tempered material (A2) generally tends to increase as the distance to the surface decreases, whereas in the Carbo-Austempered material (A1), the carbon concentration generally tends to decrease as the distance to the surface decreases. This tendency for the carbon concentration to decrease nearer the surface in the Carbo-Austempered material (A1) is thought to underlie the reduction in hardness toward the surface as observed in the Carbo-Austempered material (A1) in FIG. 6, which suggests that in the heat treatment process according to the step division method based on FIG. 3, decarbonizing from the surface of the raw material occurs when the material is allowed to cool in air to the appropriate temperature in the transportation step subsequent to step S4.

In a preferred embodiment of the present invention, the approximately 0.5 mm-thick surface portion of the wave gear base material for which heat treatment has been completed is removed in any case in the subsequent machining. Therefore, in order to extend blade life in machining and obtain other effects, the hardness of a surface portion having a specific thickness can be reduced by intentionally decarbonizing the surface of the raw material during heat treatment.

This decarbonizing can be performed by exposing the raw material to air (as an example of a decarbonizing atmosphere having a low carbon potential) for a certain period of time in step S5, as in the aforementioned step division method. Also in cases where the sequence of heat treatment is carried out on the same equipment without use of the step division method, in the latter half of the treatment process, e.g., after S3 or during a certain period after S2-3 in FIG. 3 or FIG. 5, a method may be employed for controlling conditions to obtain a decarbonizing atmosphere having a low carbon potential. During this intentional decarbonizing, the surface depth range for decarbonizing can be appropriately set by appropriately selecting the time for exposure to the low-carbon-potential decarbonizing atmosphere, the carbon potential, the maintained temperature, and other conditions so that the low-hardness surface layer formed in the intentional decarbonizing step is completely removed in the subsequent machining, and the expected high hardness is ensured on the surface of the product after removal of the surface layer.

During carburizing or carbo-nitriding, localized control of carbo-nitriding may be performed so that the cylindrical tube portion 4C, in which high spring properties and tooth durability are required, has a high carbon concentration relative to the output portion 4A and the flange portion 4B.

Industrial Applicability

The present invention is useful as a method for manufacturing a base material for a wave gear which enables the effective suppression of man-hours and manufacturing cost while providing the required strength and elastic deformation characteristics for an external gear of a wave gear.

DESCRIPTION OF REFERENCE NUMERALS/MARKS 2 plate
3 work piece
4A output portion
4B flange portion
4C cylindrical tube portion

The invention claimed is:

1. A method for manufacturing a base material for a wave gear comprising:
   subjecting steel having a carbon content of 0.5 weight % or less to primary molding by cold working into the shape of an external gear for a wave gear;
   heating the resulting primary molded article to a temperature range in which the main phase of the metallographic structure thereof forms an austenitic structure;
   rapid cooling to a predetermined temperature higher than a martensitic transformation starting temperature, and maintaining the predetermined temperature for a predetermined time, thereby forming a metallographic structure having bainite as the main phase thereof; and
   cooling the article to normal temperature.

2. The method for manufacturing the base material for the wave gear according to claim 1, wherein chromium molybdenum steel having a carbon content of 0.4 weight % or less is used as the steel.

3. The method for manufacturing the base material for the wave gear according to claim 1, wherein the hardness of the metallographic structure is set to Hv 300-500 by maintaining the primary molded article in a carburizing or carbonitriding gas atmosphere for a predetermined time in the temperature range at which the austenitic structure is formed.

4. The method for manufacturing the base material for the wave gear according to claim 3, wherein the difference between the maximum hardness and minimum hardness of the metallographic structure ranging to a depth of 2 mm from a surface of the base material is set to within Hv 130.

5. The method for manufacturing the base material for the wave gear according to claim 1, wherein quenching from the temperature range in which the austenitic structure is formed is performed by gas quenching using an inert gas.

6. The method for manufacturing the base material for the wave gear according to claim 1, wherein, after the primary molded article has been maintained in a carburizing or carbonitriding gas atmosphere for a predetermined time, the primary molded article is exposed for a predetermined period of time to a decarbonizing atmosphere having a low carbon potential.

7. A method for manufacturing a base material for a wave gear comprising:
   subjecting steel having a carbon content of 0.5 weight % or less to primary molding by cold working into the shape of an external gear for a wave gear;
   heating the resulting primary molded article to a temperature range in which the main phase of the metallographic structure thereof forms an austenitic structure;
   rapid cooling to a martensite region and subsequent tempering, thereby forming a metallographic structure having sorbite as the main phase thereof; and
   cooling the article to normal temperature.

8. The method for manufacturing the base material for the wave gear according to claim 7, wherein chromium molybdenum steel having a carbon content of 0.4 weight % or less is used as the steel.

9. The method for manufacturing the base material for the wave gear according to claim 7, wherein the hardness of the metallographic structure is set to Hv 300-500 by maintaining the primary molded article in a carburizing or carbonitriding gas atmosphere for a predetermined time in the temperature range at which the austenitic structure is formed.

10. The method for manufacturing the base material for the wave gear according to claim 9, wherein the difference between the maximum hardness and minimum hardness of the metallographic structure ranging to a depth of 2 mm from a surface of the base material is set to within Hv 130.

11. The method for manufacturing the base material for the wave gear according to claim 7, wherein quenching from the temperature range in which the austenitic structure is formed is performed by gas quenching using an inert gas.

12. The method for manufacturing the base material for the wave gear according to claim 7, wherein, after the primary molded article has been maintained in a carburizing or carbonitriding gas atmosphere for a predetermined time, the primary molded article is exposed for a predetermined period of time to a decarbonizing atmosphere having a low carbon potential.

\* \* \* \* \*